(12) United States Patent
Behera et al.

(10) Patent No.: US 12,389,179 B2
(45) Date of Patent: Aug. 12, 2025

(54) SYSTEM AND METHOD FOR SECURITY AND MANAGEMENT OF COMPUTER-AIDED DESIGNS

(71) Applicant: NEW YORK UNIVERSITY, New York, NY (US)

(72) Inventors: Rakesh Kumar Behera, Jersey City, NJ (US); Sarvesh Sivaprakasam, Queens, NY (US); Lakshmi Narasimhan Jagannathan, Queens, NY (US); Nikhil Gupta, Ossining, NY (US)

(73) Assignee: New York University, New York, NY (US)

( * ) Notice: Subject to any disclaimer, the term of this patent is extended or adjusted under 35 U.S.C. 154(b) by 1059 days.

(21) Appl. No.: 16/657,048

(22) Filed: Oct. 18, 2019

(65) Prior Publication Data

US 2020/0125767 A1 Apr. 23, 2020

Related U.S. Application Data

(60) Provisional application No. 62/747,814, filed on Oct. 19, 2018.

(51) Int. Cl.
*H04S 1/00* (2006.01)
*G10L 19/00* (2013.01)
*G10L 25/51* (2013.01)

(52) U.S. Cl.
CPC .......... *H04S 1/007* (2013.01); *G10L 19/0017* (2013.01); *G10L 25/51* (2013.01)

(58) Field of Classification Search
CPC .......... G06F 21/64; G06F 17/14; G06F 16/11; G06F 16/13; G06F 16/683; G06F 17/141;
(Continued)

(56) References Cited

U.S. PATENT DOCUMENTS

| | | | |
|---|---|---|---|
| 6,332,043 B1 * | 12/2001 | Ogata | H04N 19/635 375/E7.129 |
| 9,305,467 B1 * | 4/2016 | Gibbs | G06Q 30/0621 |

(Continued)

OTHER PUBLICATIONS

Cazan et al. "Algorithms and Techniques for Image to Sound Conversion for Helping the Visually Impaired People—Application Proposal," 2007 14th International Workshop on Systems, Signals and Image Processing and 6th EURASIP Conference focused on Speech and Image Processing, Multimedia Communications and Services, pp. 471-474 (2007).

(Continued)

*Primary Examiner* — Richemond Dorvil
*Assistant Examiner* — Ethan Daniel Kim
(74) *Attorney, Agent, or Firm* — Riverside Law LLP

(57) ABSTRACT

A system for producing an audio file comprises a non-transitory computer-readable medium with instructions stored thereon, that when executed by a processor perform the steps of converting an additive manufacturing design file to a text-based file, converting the text-based file to a series of binary values, converting the series of binary values to a series of integers, calculating a normalization factor for the series of integers, dividing each of the series of integers by the normalizing factor to produce an array of floating point numbers known as the design string, multiplying the design string with the normalizing factor and comparing the resulting arrays with the original array of integers to generate the error string, converting the design string to an audio file, and converting the normalizing factor and the error string to a text file. Systems for verifying the authenticity of, identifying, and compressing AM design files are also described.

18 Claims, 13 Drawing Sheets

(58) Field of Classification Search
CPC ........ G06F 16/116; G10L 19/00; G10L 25/51; G10L 19/0017; H04S 1/00; H04S 1/007
See application file for complete search history.

(56) References Cited

U.S. PATENT DOCUMENTS

| | | | | |
|---|---|---|---|---|
| 2011/0153362 | A1* | 6/2011 | Valin | G06F 17/00 |
| | | | | 705/3 |
| 2014/0086416 | A1* | 3/2014 | Sen | G10L 19/008 |
| | | | | 381/23 |
| 2017/0371545 | A1* | 12/2017 | Smithers | G06F 3/0604 |
| 2018/0095450 | A1* | 4/2018 | Lappas | B33Y 10/00 |
| 2019/0132948 | A1* | 5/2019 | Longinotti-Buitoni | |
| | | | | A61B 5/6805 |
| 2021/0146625 | A1* | 5/2021 | Barnes | B29C 64/165 |

OTHER PUBLICATIONS

Zhang et al. "An Efficient Method of Image-Sound Conversion Based on IFFT for Vision Aid for the Blind," Lecture Notes on Software Engineering vol. 2, No. 1, pp. 54-57 (2014).

* cited by examiner

SYSTEM AND METHOD FOR SECURITY AND MANAGEMENT OF COMPUTER-AIDED DESIGNS

CROSS-REFERENCE TO RELATED APPLICATIONS

This application claims priority to U.S. Provisional Patent Application No. 62/747,814, filed on Oct. 19, 2018, incorporated herein by reference in its entirety.

BACKGROUND OF THE INVENTION

Additive Manufacturing (AM), also called "3D printing", is one of the fastest growing manufacturing technologies, with a global market value of over $5 billion in 2015 and is projected to surpass $10 billion by 2021. Industries focusing on lightweight engineering and customized products such as aerospace, automotive, and health care are just a few of the sectors working to adopt AM into their supply chains. The tool-free layer-by-layer printing approach in AM provides the capability to produce parts of high geometrical complexity, some of which cannot be manufactured by any other manufacturing techniques. In addition, the additive nature of the printing process provides an excellent material efficiency, resulting in significantly less scrap when compared to more complex milled parts, which is particularly attractive for processing expensive materials such as titanium. However, the new opportunities presented by the AM process chain bring with them significant new challenges related to cybersecurity and intellectual property theft.

CAD solid model files used for 3D printing have enormous value because such files can be used to print parts in repeatable high quality without any special skill or additional knowledge. Stolen CAD files can easily lead to counterfeiting and intellectual property theft. In addition, sabotage can be conducted by making small, subtle changes in the design. Technologies that can provide protection against any of these threats are in high demand as an increasing number of major manufacturers are making extensive use of 3D printing.

The AM process chain depends heavily on software and cloud-based resources to generate, store and/or transfer the digital files necessary for printing. Beginning with the computer aided design (CAD) file and through to the AM instruction set (in some examples, g-code), sensitive information can be misappropriated or maliciously modified during a cyberattack. In order to avoid the risk of counterfeiting or sabotage, new and unique ways to protect design information are needed in order to keep the process secure. The present invention satisfies that need.

SUMMARY OF THE INVENTION

In one aspect, a system for producing an audio file comprises a non-transitory computer-readable medium with instructions stored thereon, that when executed by a processor perform the steps of converting an additive manufacturing design file to a text-based file, converting the text-based file to a series of binary values, converting the series of binary values to a series of integers, calculating a normalization factor for the series of integers, dividing each of the series of integers by the normalizing factor to produce an array of floating-point numbers, storing the floating-point array in a design string, multiplying the design string with the normalizing factor and comparing the resulting arrays with the original array of integers, the difference between the two arrays resulting in an error string, converting the design string to an audio file, and storing the error string and the normalizing factor in a text file.

In one embodiment, the instructions further comprise the step of converting the design audio file to a frequency domain using a Discrete Fourier Transform. In one embodiment, the instructions further comprise the step of producing a stereo output audio file wherein the design audio file is one channel of the output audio file and the other channel comprises music. In one embodiment, the instructions further comprise the step of applying an audio compression algorithm to the output audio file. In one embodiment, the audio compression algorithm is a lossless audio compression algorithm. In one embodiment, the instructions further comprise reversing each of the binary values in the series. In one embodiment, the instructions further comprise adding a demarcating value between each of the binary values in the series. In one embodiment, the demarcating value is −1. In one embodiment, the instructions further comprise generating a random position number I and inserting an additional binary value in the Ith position in the series of binary values.

In another aspect, a system for verifying the authenticity of an additive manufacturing design file comprises a non-transitory computer-readable medium with instructions stored thereon, that when executed by a processor perform the steps of converting a first additive manufacturing design file to a text-based file, converting the text-based file to a series of binary values, converting the series of binary values to a series of integers, calculating a normalization factor for the series of integers, dividing each of the series of integers by the normalizing factor to produce an array of floating point numbers, multiplying the array of floating point numbers by the normalizing factor and subtracting the series of integers to produce an error string, converting the array of floating point numbers to a first audio output file, converting the normalizing factor and the error string to a text file, comparing the first output audio file to a second output audio file generated from a second additive manufacturing design file, and indicating via an output means that the first additive manufacturing design file is authentic if the first output audio file matches the second output audio file.

In one embodiment, the instructions further comprise the steps of generating a first audio fingerprint from the first output audio file, comparing the first audio fingerprint to a second audio fingerprint generated from the second output audio file, and determining that the first output audio file matches the second output audio file if the first audio fingerprint matches the second audio fingerprint. In one embodiment, the instructions further comprise the step of applying an audio compression algorithm to the first audio file. In one embodiment, the instructions further comprise the step of converting the output audio file to a frequency domain using a Discrete Fourier Transform.

In another aspect, a system for identifying an additive-manufacturing design file comprises a non-transitory computer-readable medium with instructions stored thereon, that when executed by a processor perform the steps of converting an additive manufacturing design file to a text-based file, converting the text-based file to a series of binary values, converting the series of binary values to a series of integers, calculating a normalization factor for the series of integers, dividing each of the series of integers by the normalizing factor to produce an array of floating point numbers, multiplying the array of floating point numbers by the normalizing factor and subtracting the series of integers to produce an error string, converting the array of floating point numbers to a first audio output file, converting the normalizing factor and the error string to a text file, generating a first audio fingerprint from the output audio file, comparing the first audio fingerprint to a library of audio fingerprints stored in a database, each audio fingerprint in the library of audio fingerprints being associated with an additive manufacturing design file from which the audio fingerprint was generated, and indicating via an output means an identifying parameter of the additive manufacturing design file if the first audio fingerprint matches an audio fingerprint from the library of audio fingerprints.

In one embodiment, the instructions further comprise the step of applying an audio compression algorithm to the first audio file. In one embodiment, the instructions further comprise the step of converting the output audio file to a frequency domain using a Discrete Fourier Transform.

In another aspect, a system for compressing an additive-manufacturing design file comprises a non-transitory computer-readable medium with instructions stored thereon, that when executed by a processor perform the steps of converting an additive manufacturing design file to a text-based file, converting the text-based file to a series of binary values, converting the series of binary values to a series of integers, calculating a normalization factor for the series of integers, dividing each of the series of integers by the normalizing factor to produce an array of floating point numbers, multiplying the array of floating point numbers by the normalizing factor and subtracting the series of integers to produce an error string, converting the array of floating point numbers to a first audio output file, converting the normalizing factor and the error string to a text file, and compressing the output audio file using an audio compression algorithm.

In one embodiment, the audio compression algorithm is a lossless compression algorithm. In one embodiment, the audio compression algorithm is FLAC.

In another aspect, a system for producing an audio file comprises a non-transitory computer-readable medium with instructions stored thereon, that when executed by a processor perform the steps of converting a CAD file to a text-based file, converting the text-based file to a series of binary values, reversing each binary value for added security, adding "−1" for demarking space between different binary values to produce a resulting array, converting the resulting array to individual bits, and generating an output audio file from the individual bits.

In another aspect, a system for producing an audio file comprises a non-transitory computer-readable medium with instructions stored thereon, that when executed by a processor perform the steps of converting a CAD file to a text-based file, converting the text-based file to a series of binary values, generating a random number and adding "0" to the binary values after each random number positions in the binary data to improve security, reversing each of the binary values in the series with the random number for added security, adding "−1" for demarking space between different binary values with the random number to produce a resulting array, converting the resulting array to individual bits, and generating an output audio file from the individual bits.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1B:
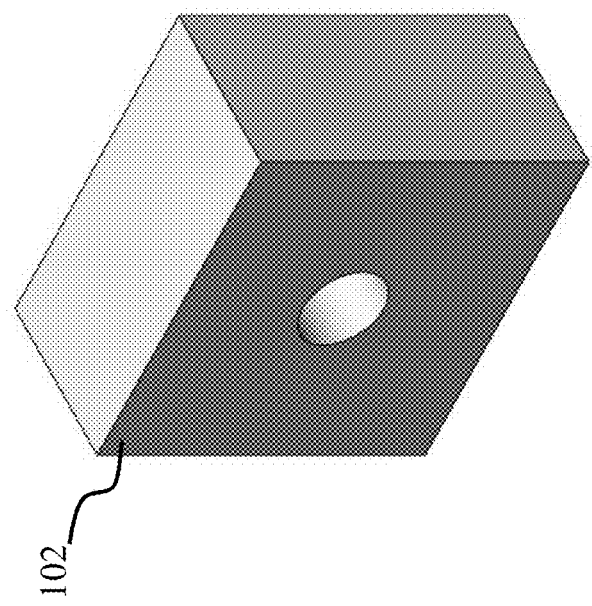
FIG. 1B is an exemplary output CAD solid model file of the present invention.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C #, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Some aspects of the present invention may be made using an additive manufacturing (AM) process. Among the most common forms of additive manufacturing are the various techniques that fall under the umbrella of "3D Printing", including but not limited to stereolithography (SLA), digital light processing (DLP), fused deposition modelling (FDM), selective laser sintering (SLS), selective laser melting (SLM), electronic beam melting (EBM), and laminated object manufacturing (LOM). These methods variously "build" a three-dimensional physical model of a part, one layer at a time, providing significant efficiencies in rapid prototyping and small-batch manufacturing. AM also makes possible the manufacture of parts with features that conventional subtractive manufacturing techniques (for example CNC milling) are unable to create.

Systems and methods of the present invention relate to a method of converting CAD solid models to sound. Conversion into an audio file offers many opportunities for further file manipulation according to methods of the present invention, including but not limited to audio fingerprint creation and identification (for example using an app such as "Shazam"), or using audio compression algorithms to compress the resulting files. Embodiments of the present invention further relate to creating a searchable library of CAD files using resulting audio fingerprints, allowing for quick cataloging and search of CAD files based on geometric feature, functionality that is not possible when searching through un-converted CAD solid models. In some embodiments, feature-based search methods of the present invention may further be applied to image files that are converted to sound using methods of the present invention.

CAD solid models are generated using various software packages, for example Solidworks or AutoCAD. In one embodiment, a process for converting a CAD model to sound begins with the step of converting the solid model to a text file in a format. The file may be converted for example to an .x_t file using Solidworks, or may alternatively be converted using BASE64 encoding. Next, the resulting text is converted to binary data. Conversion from text to binary format can be conducted manually or by using a computer program. In some embodiments of methods of the present invention, the CAD solid model may be saved directly to a suitable binary format. In some embodiments, the binary format is divided into a series of binary words, each comprising a series of bits. Suitable word sizes may include one byte (eight bits), two bytes, four bytes, eight bytes, sixteen bytes, or any other suitable size. In some embodiments, some or all of the words may be endian-swapped (i.e. converted from big endian to little endian, for example a converting the four byte word 0x0A0B0C0D to 0x0D0C0B0A) for added security. In some embodiments, some or all of the words may be reversed (i.e. have their bit order inverted, for example converting a one byte word 0x31 to 0x8C) for added security. In some embodiments, some or all of the words may be inverted (i.e. switching ones and zeroes, for example converting 0x31 to 0xCE) for added security. In some embodiments, some or all of the words may have a bit inserted in a particular position, for example in one or more particular positions or periodically, i.e. once every I positions. In one example, the byte '00110001' has a 0 inserted once every I=3 positions, resulting in the binary string '0010100001'. In another example, the bytes '00110001' and '00110010' each have a 0 inserted in the fifth position, resulting in the binary strings '001100001' and '001100010'. In some embodiments, a value of −1 may be added between different words in order to demarcate the spaces between different words. For example, two bytes 0x31 and 0x32 may be demarcated with a −1, resulting in a binary string of 00110001-100110010. In some embodiments, methods of the present invention further comprise the step of converting a string of binary values into individual bits.

The above-mentioned security steps may each be reversed in a decoding method of the present invention. For example, an endian swap may be reversed by another endian swap, an inversion may be reversed by another inversion, and a bit insertion may be reversed by a selective bit removal.

In some embodiments, a method of the present invention may comprise the steps of generating one or more random numbers for use with encoding and decoding methods of the present invention. In one exemplary embodiment, a random summing number is generated and a random interval number (positive integer) is generated. Once every interval number (same as random number) samples, the random summing number is added to the floating point numbers after filtering and before binary conversion. In one exemplary embodiment, the random summing number and the random interval number are both 15. In this embodiment, 15 is added to every $15^{th}$ floating point value, and the length of the array does not change. In another embodiment, instead of a random summing number, a random delimiting number is generated. In one example, the random delimiting number and the random interval number are both 15. In this embodiment, a floating point value of 15 is inserted into every $15^{th}$ place in the array of floating point values. Therefore, an array having an original length of 45 floating point numbers would have a final length of 48 floating point numbers, having a 15 inserted in the $15^{th}$, $30^{th}$, and $45^{th}$ positions. Although the random interval number, the random summing number, and the random delimiting number used in the presented example are all 15, it is understood that some or all of these values may be different in various embodiments of the invention. The random interval number, the random summing number, and/or the random delimiting number may then be appended to or otherwise transmitted with the encoded data in order to be used in the decoding method later.

The binary data may then be passed through a digital filter which converts the binary data to integers. In some embodiments, the result is a string of signed integers, while in other embodiments the integer string may be unsigned. The integer array is then normalized between −1 and 1 (for signed integers) or between 0 and 1 (for unsigned) by dividing all the values by the same number, called normalization factor. The normalization factor may be calculated by any suitable means known in the art, for example by choosing the maximum absolute value of an integer in the string of integers (thus setting that integer to 1 or −1 in the normalized string). The result of the normalization is then broken into two strings of numbers, in some embodiments referred to as the design string and error string. The design string contains floating point numbers between −1 and 1 (or 0 and 1 for unsigned). Multiplying the arrays in the design string with the normalizing factor and comparing with the integer arrays obtained from the digital filter before normalizing, the error string is calculated. The discrete data in the design string is then saved as a .wav file in the time domain, which can be played as a regular sound file. The generated sound files can be "decrypted" by conducting a reverse operation.

A CAD solid model encoded to sound using methods of the present invention decomposes the CAD data into three components: a normalization factor, a string of numbers representing the normalized design data that can be represented as a string of numbers or a matrix, and an error function that can be represented as a string, numbers, or a matrix. Any of these three components taken alone is incapable of being reconstituted into the original solid model. The design dataset can be represented in the form of sound and can be transmitted, compressed or processed like a sound file. Only someone in possession of all three of these components is capable of regenerating the original dataset that can be used to create the solid model.

Although methods of the present invention are described as operating on CAD model files, it is understood that methods of the present invention offer a completely reversible way to transform any arbitrary binary file into encrypted sound data. Examples of binary data for use as an input to the present invention include, but are not limited to, image data, application files, encryption keys, documents, or video files.

Figure 1A:
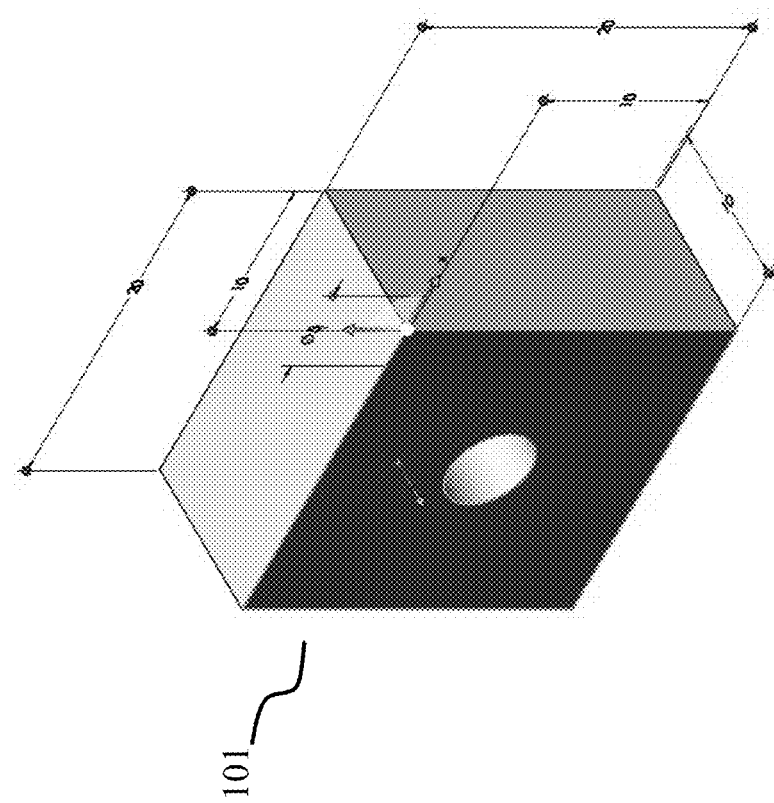
FIG. 1A is an exemplary input CAD solid model file of the present invention.

Referring now to FIG. 1, an exemplary input and output CAD solid model file of the present invention is shown. In the depicted example, CAD solid model 101 is the CAD model used as an input to the system, and CAD solid model 102 was the result of a conversion via a method of the present invention, then reversed to produce a CAD solid model identical to the original.

Figure 2A:
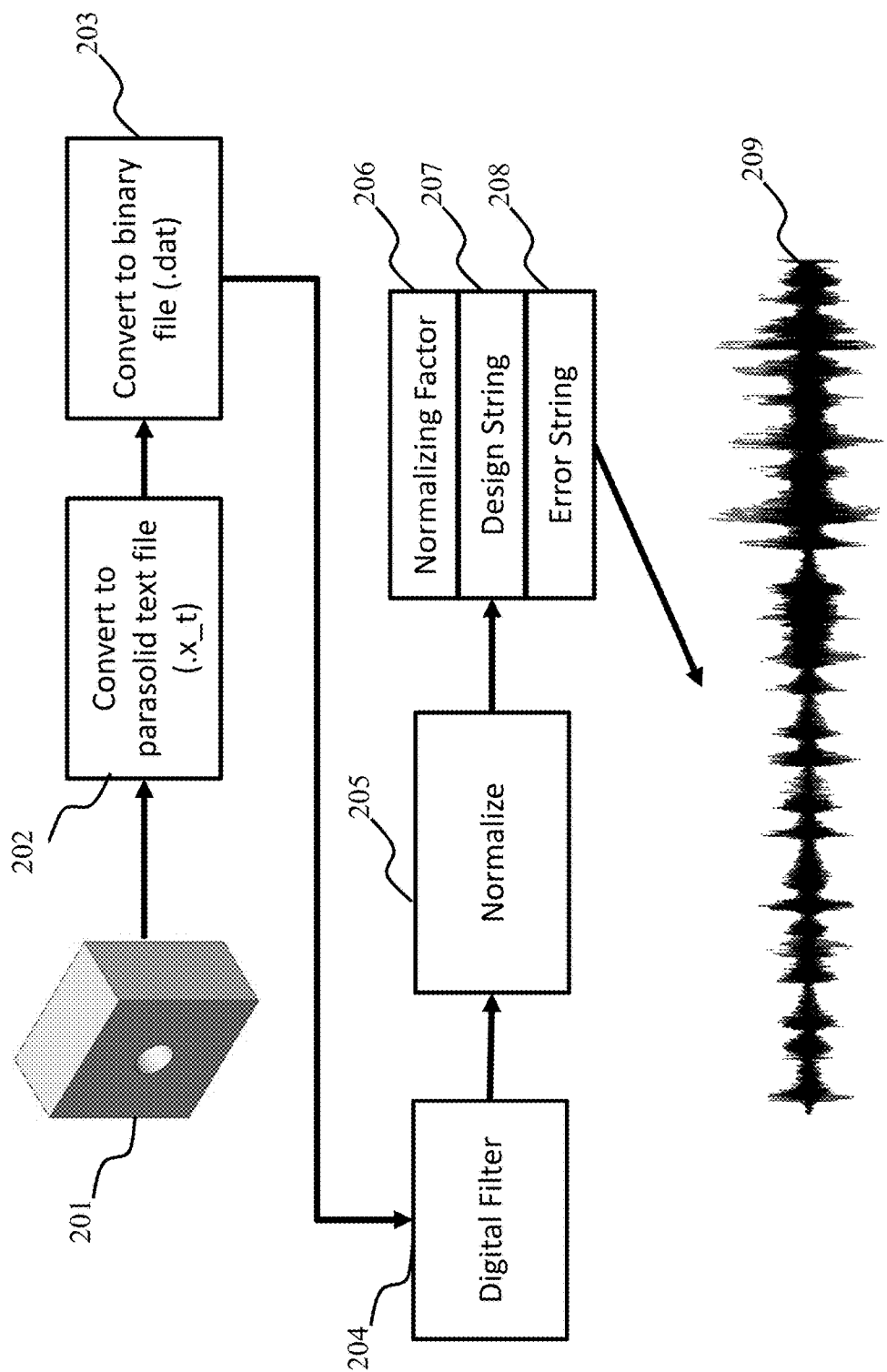
FIG. 2A is an exemplary encoding workflow of the present invention.

Referring now to FIG. 2A, an exemplary encoding method of the present invention is shown. A CAD solid model 201 is first converted to a Parasolid text file, for example a .x_t file, in step 202. The text file is converted to a raw binary file, for example a .dat file, in step 203. The binary file is then passed through a digital filter in step 204, in which it is converted to a series of integers. The digital filter used may comprise one or more different filters, for example a rational transfer function. In one embodiment, the digital filter is based on the equation below, which may be modified by changing the a and b parameters.

$$H(z) = \frac{y(z)}{x(z)} = \frac{b_1 z^0 + b_2 z^{-1} + \ldots + b_{(nb+1)} z^{-nb}}{a_1 z^0 + a_2 z^{-1} + \ldots + a_{(na+1)} z^{-na}}$$

Figure 6A:
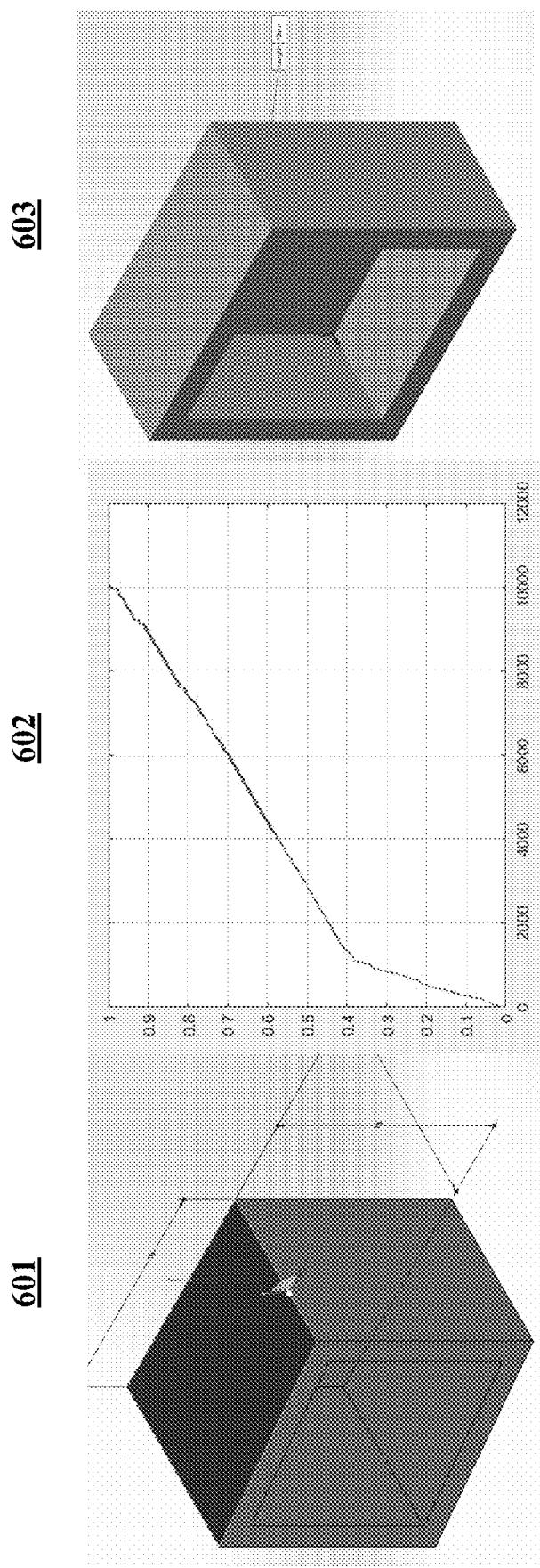
FIG. 6A is the result of an encoding and decoding cycle of the present invention.
Figure 6B:
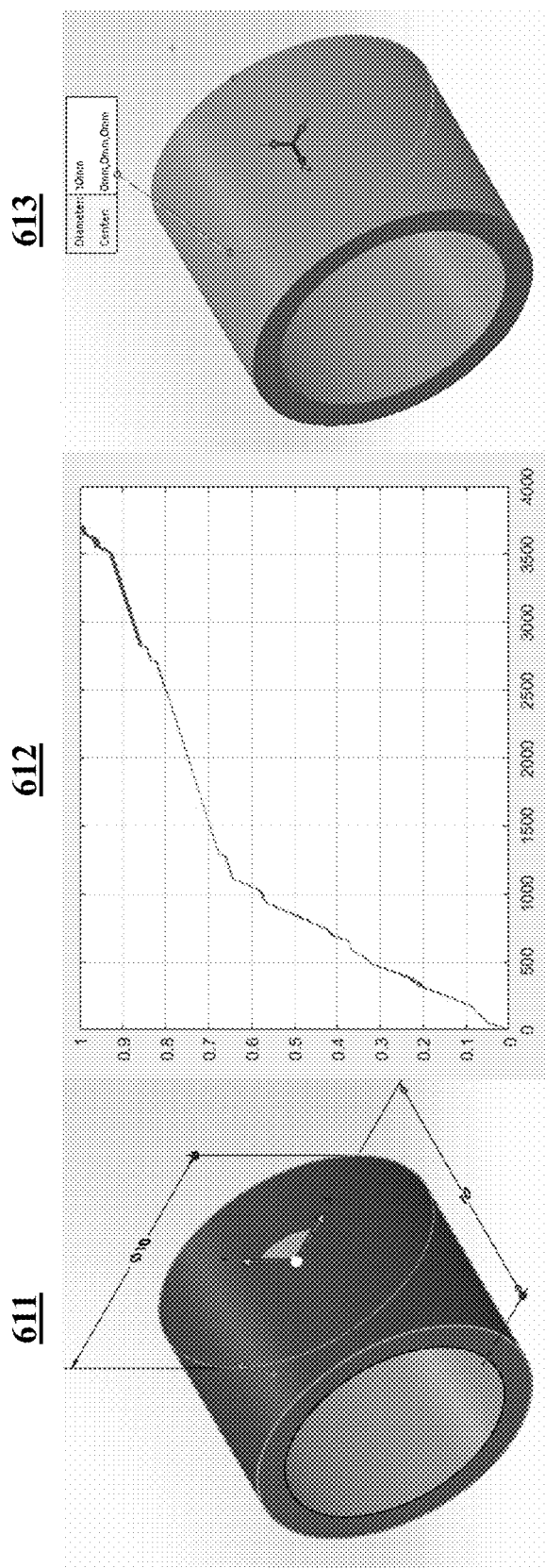
FIG. 6B is the result of an encoding and decoding cycle of the present invention.
Figure 6C:
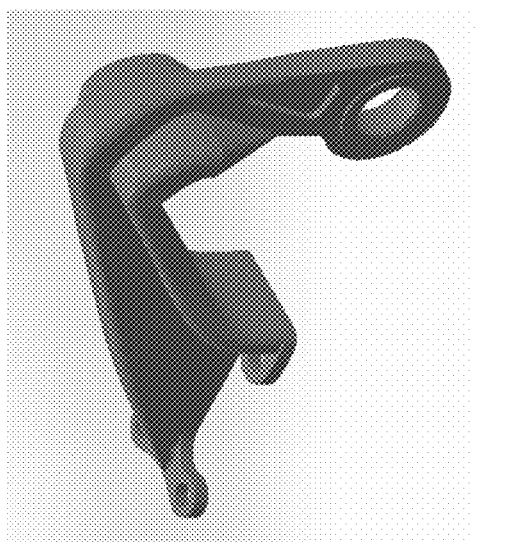
FIG. 6C is the result of an encoding and decoding cycle of the present invention.
Figure 6C:
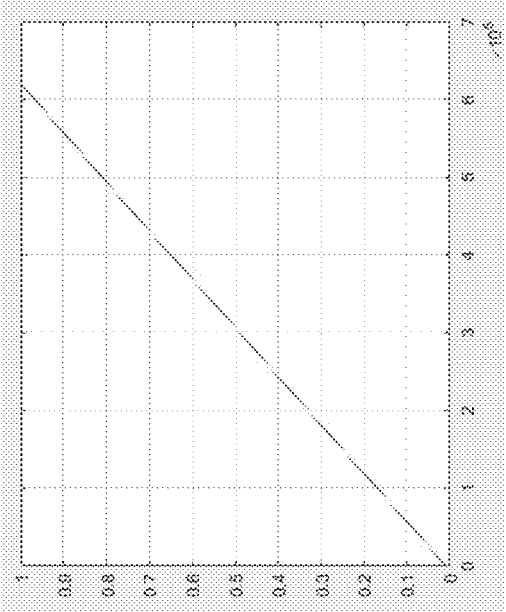
Figure 6C:
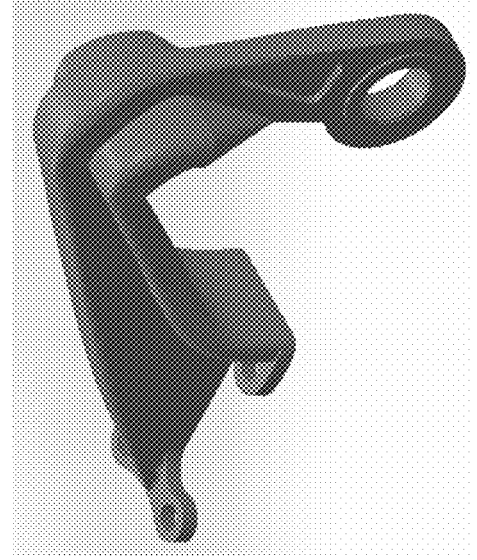

In one embodiment, for example the digital filter used in the exemplary embodiments shown in FIG. 6A, FIG. 6B, and FIG. 6C, a=[1 0 −1] and b=[1 0]. In other embodiments, alternate values of a and b may be used, for example a=[1 0 1] and b=[1 0]. In various embodiments, the series of integers may be 8-bit, 16-bit, 32-bit, or 64-bit integers. The series of integers is then normalized in step 205, by first determining a normalization factor, dividing the integers by the normalization factor, and calculating the normalized result and the remainder as an error string. The normalization process produces three elements, the normalizing factor 206, the design string 207, and the error string 208. The design string 207 may then be converted into a sound file 209. In some embodiments, the design string 207 is first converted to the frequency domain, for example via a discrete-time Fourier transform (DFT) before being converted into a sound file 209. The sound file may then be compressed, encrypted, or cataloged accordingly. Exemplary suitable compression formats for use with the present invention include, but are not limited to, FLAC, WavPack, TTA, ATRAC Advanced Lossless, ALAC, MPEG-4 SLS, MPEG-4 ALS, MPEG-4 DST, WMA Lossless, Shorten, or any other lossless audio codec. The normalizing factor 206, and the error string 208 are sent as text files.

Figure 2B:
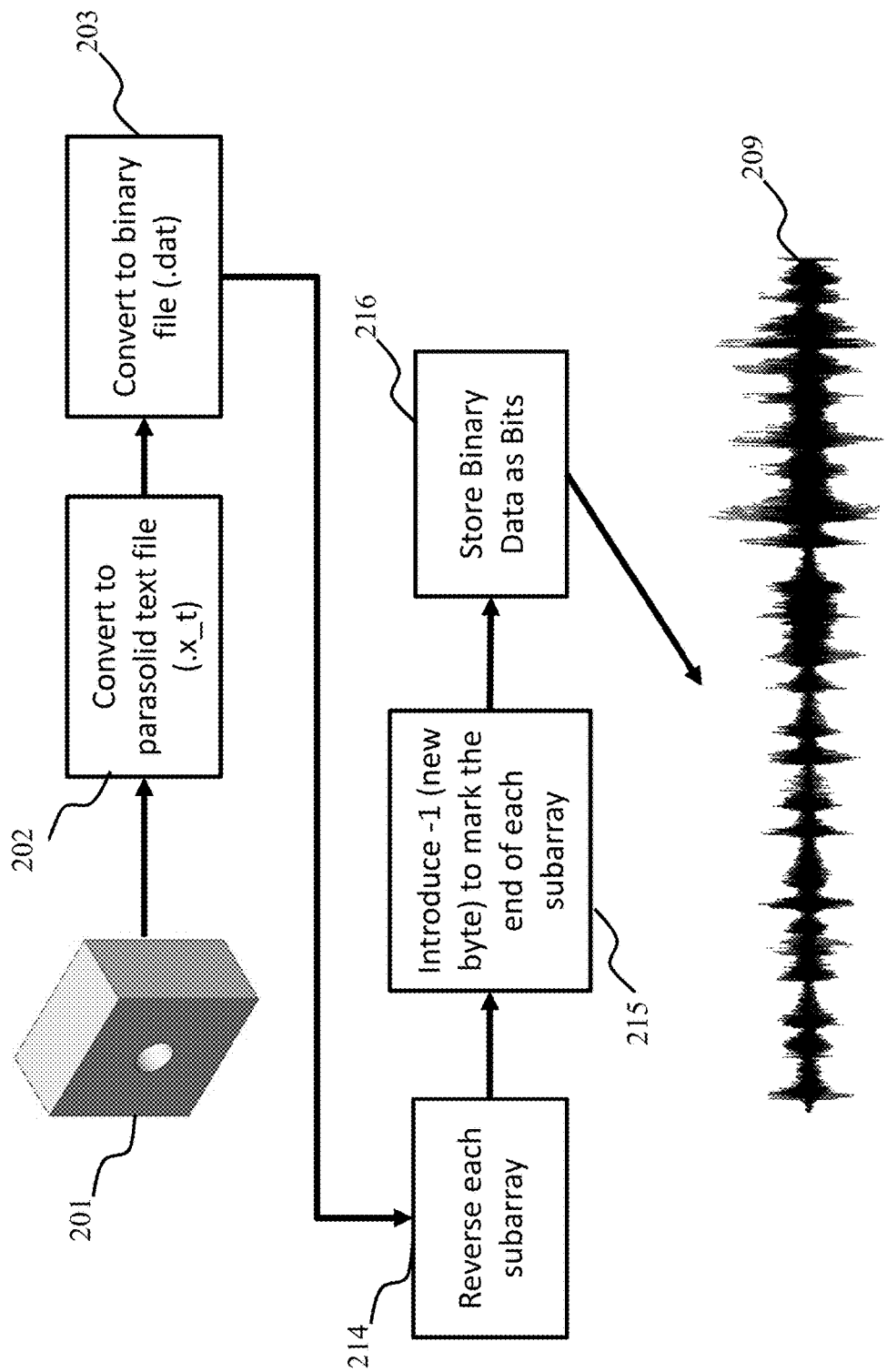
FIG. 2B is an exemplary encoding workflow of the present invention.

Referring now to FIG. 2B, an alternative encoding method of the present invention is shown. The method begins and ends similarly to the method of FIG. 2A, but here instead of applying a digital filter 204 to the binary file 203, each binary subarray in the binary string is reversed. Binary subarrays may have any suitable length, including but not limited to 4 bits, 8 bits, 16 bits, 32 bits, 64 bits, or more. A −1 value is then introduced as a demarcating value at the end of each binary subarray, in order to mark the end of the binary subarray in step 215. The resulting binary string is then stored as binary data in step 216, which is then converted to a sound file 209.

Figure 2C:
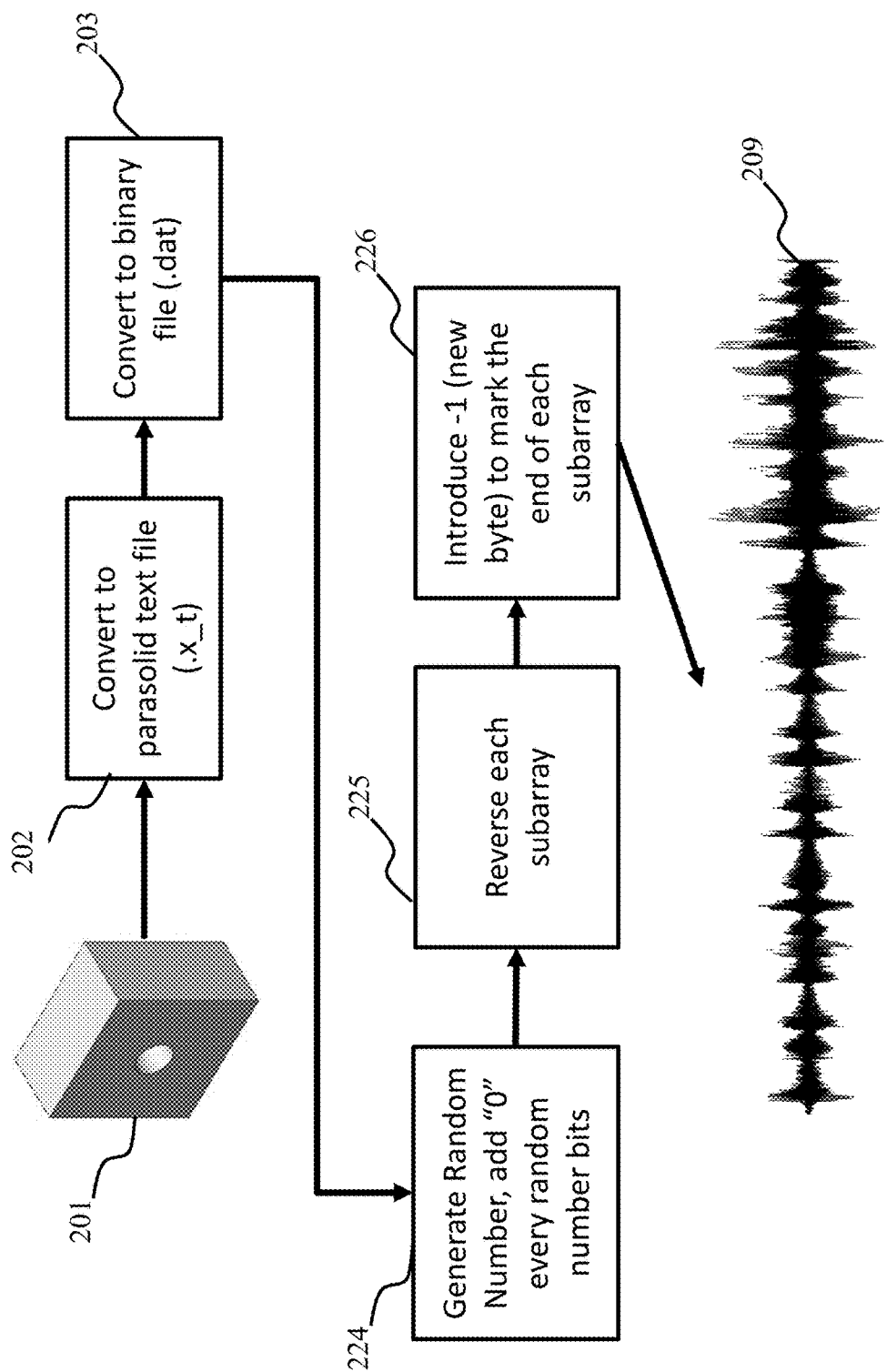
FIG. 2C is an exemplary encoding workflow of the present invention.

Referring now to FIG. 2C, another alternative encoding method of the present invention is shown. The method begins and ends similarly to the methods of FIG. 2A and FIG. 2B, but here instead of applying a digital filter 204 to the binary file 203, a random interval number is generated in step 224, and a "0" value is added to the array each random interval. Each binary subarray in the binary array is then reversed in step 225, and a −1 value is then introduced as a demarcating value at the end of each binary subarray, in order to mark the end of the binary subarray in step 226. The resulting binary string is then stored as binary data and converted to a sound file 209.

Figure 3A:
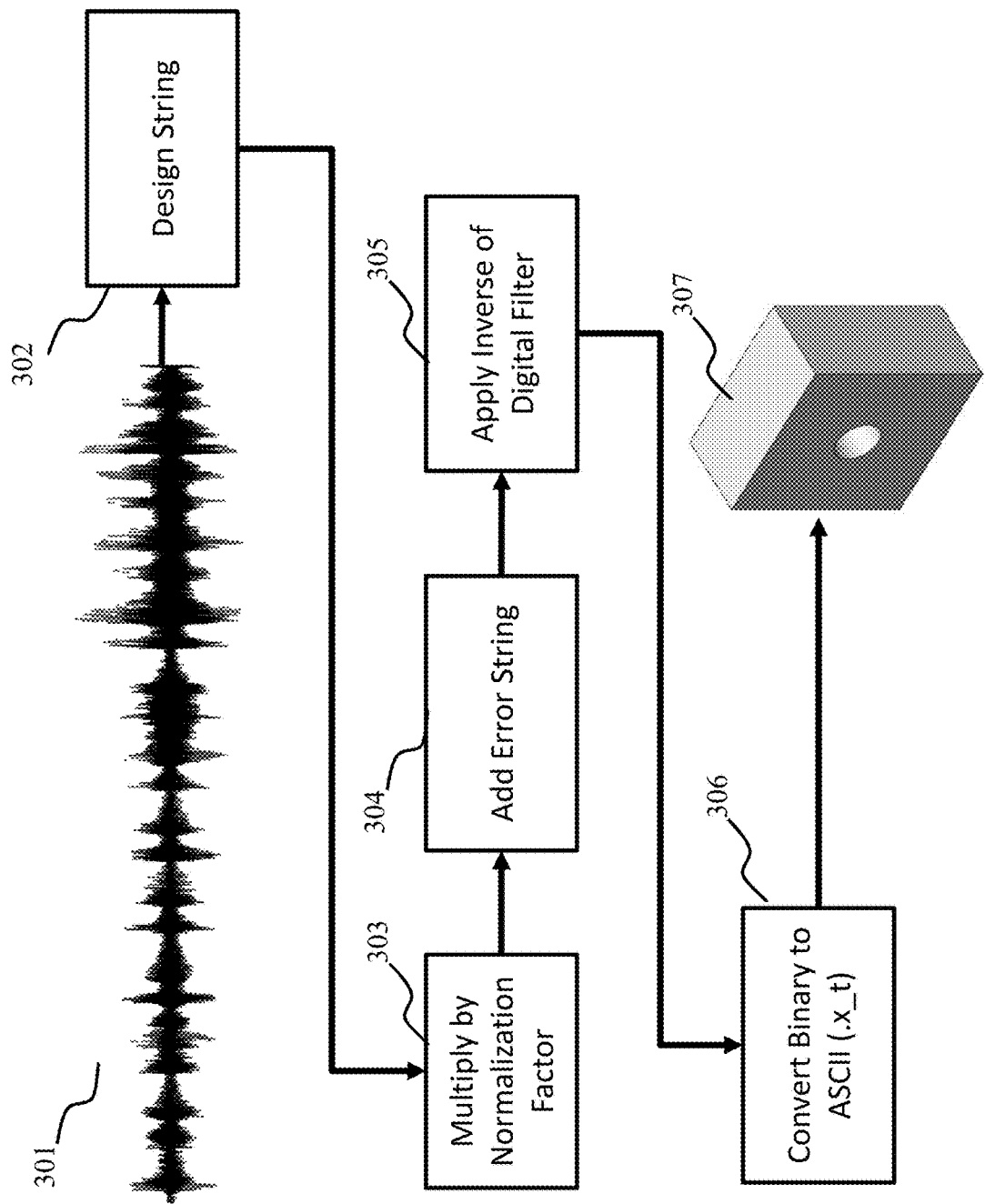
FIG. 3A is an exemplary decoding workflow of the present invention.

Referring now to FIG. 3A, the decoding process corresponding to the encoding process of FIG. 2A is shown. Beginning with an audio file 301, the design string, which in some embodiments contains the bulk of the CAD design information, is extracted. The design string 302 is then multiplied by the normalization factor in step 303. The error string is then added in step 304, and the inverse of the digital filter of step 204 is applied in step 305. The binary from the inverse digital filter is then converted to a text string 306 and saved as a text file, for example a .x_t file, from which the original CAD solid model file 307 can be reconstituted.

Figure 3B:
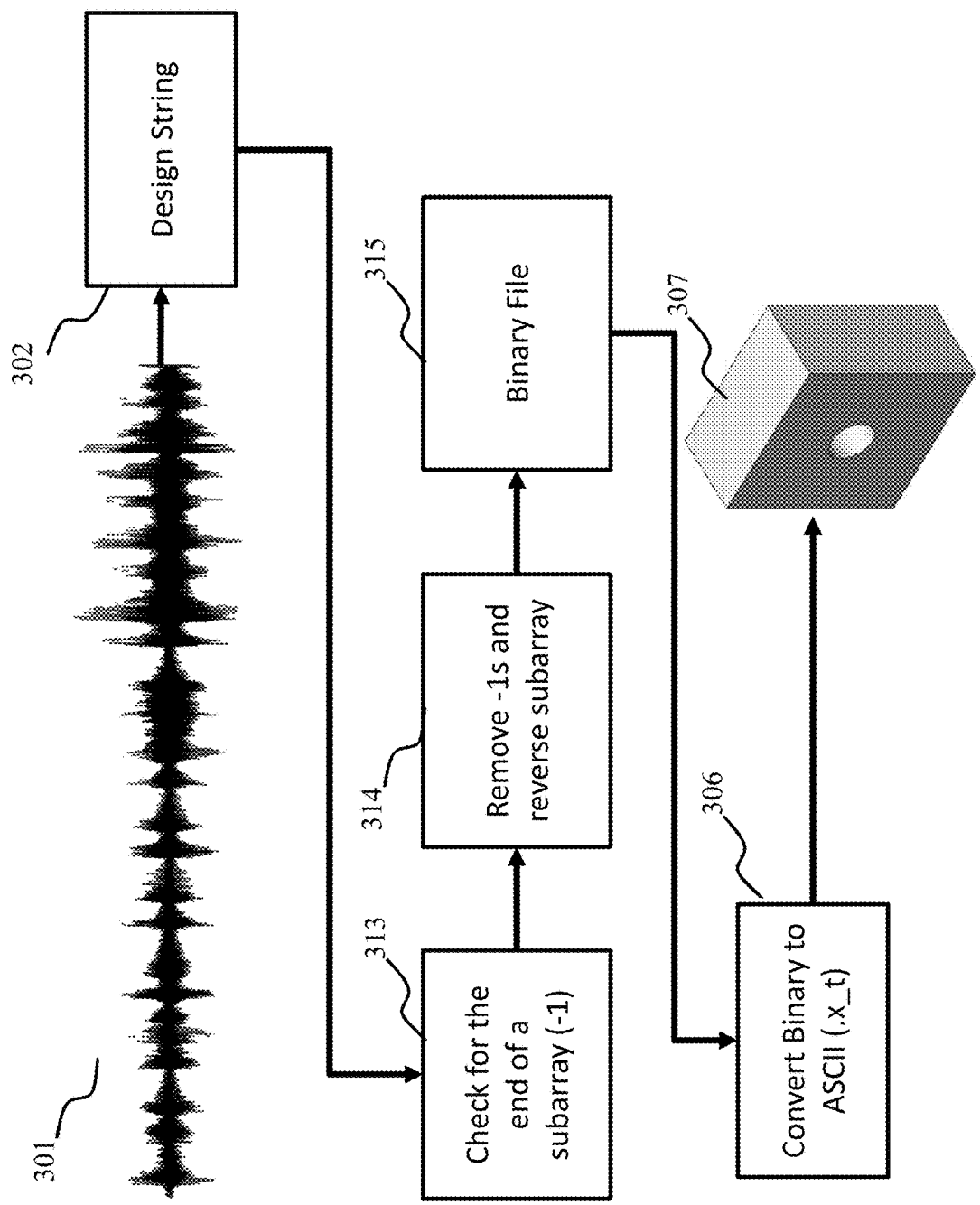
FIG. 3B is an exemplary decoding workflow of the present invention.

Referring now to FIG. 3B, the decoding process corresponding to the encoding process of FIG. 2B is shown. The decoding process is similar to the decoding process of FIG. 3A, except that instead of multiplying the design string 302 by the normalization factor 303, the method checks for the −1 demarcating the end of a binary subarray in step 313, removes the −1s and reverses the binary subarrays in step 314, and then produces the binary file in step 315.

Figure 3C:
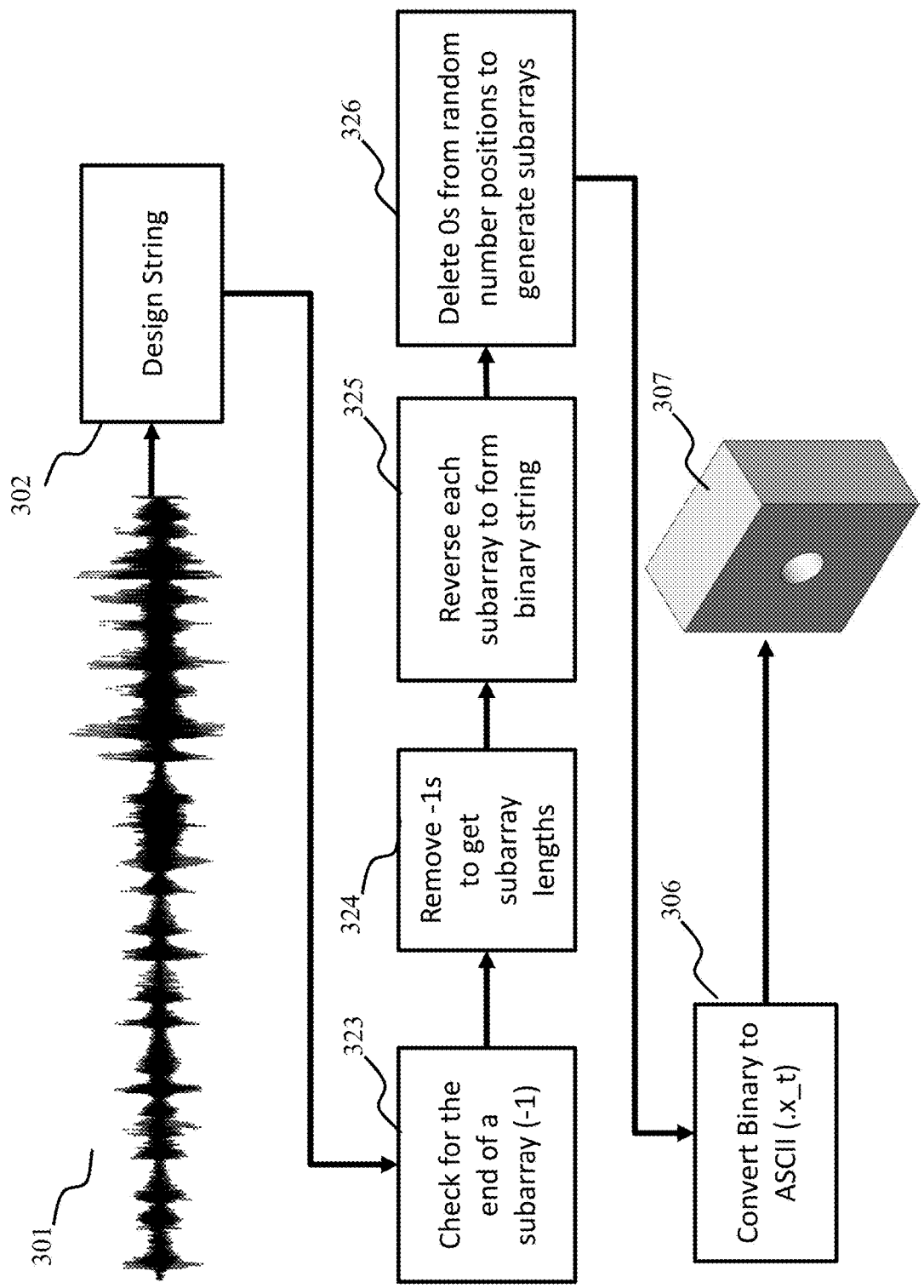
FIG. 3C is an exemplary decoding workflow of the present invention.

Referring now to FIG. 3C, the decoding process corresponding to the encoding process of FIG. 2C is shown. The decoding process is similar to the decoding process of FIG. 3A, except that instead of multiplying the design string 302 by the normalization factor 303, the method checks for the −1 demarcating the end of a binary subarray in step 323, removes the −1s to get the binary subarray lengths 324, reverses each binary subarray in step 325, and deletes the 0s from the random number positions to generate the array of binary subarrays 326 to form the binary string.

Figure 4:
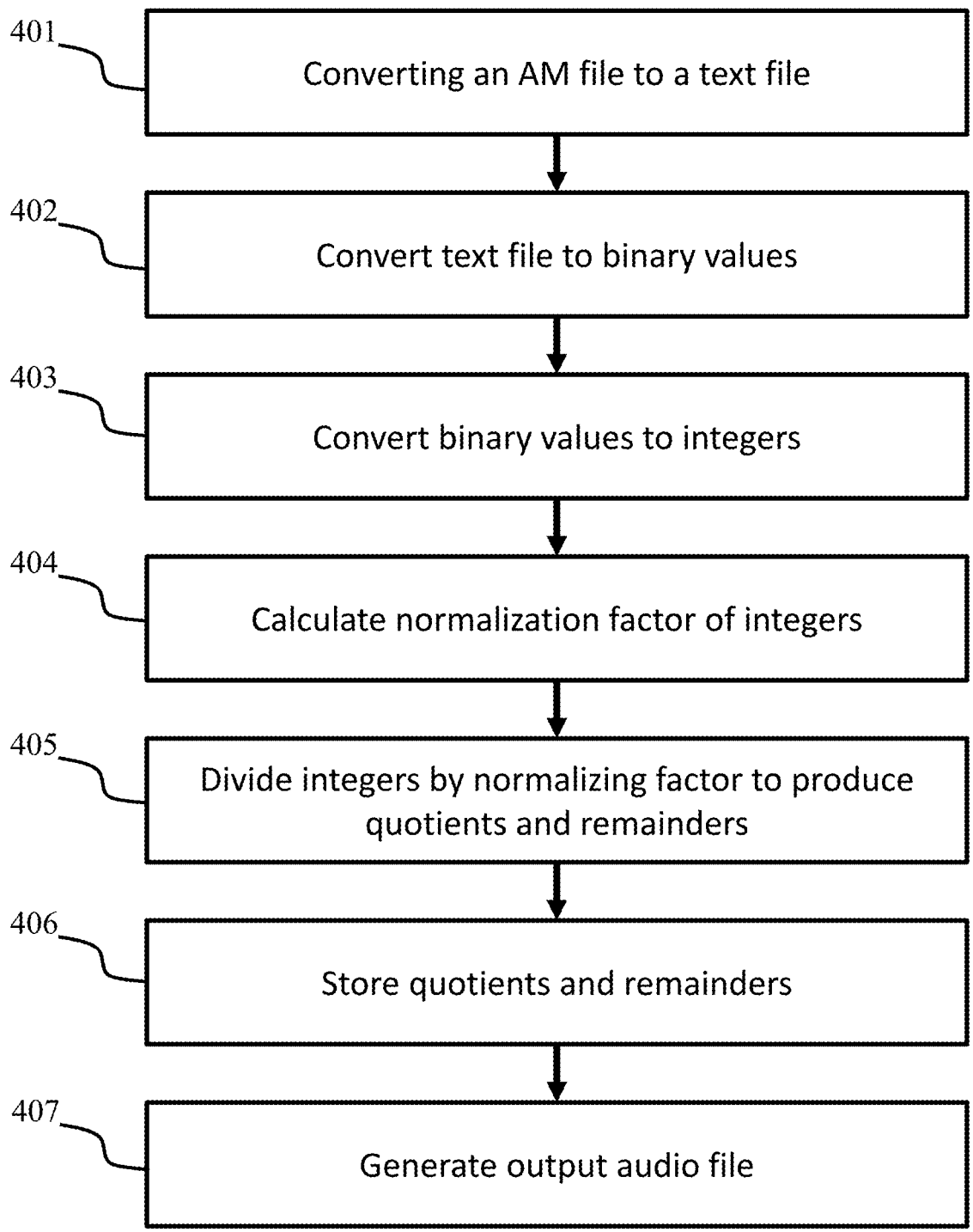
FIG. 4 is a method of the present invention.

Another example of a method of the present invention is shown in FIG. 4. The depicted method includes the steps of converting an additive manufacturing design file to a text-based file in step 401, converting the text-based file to a series of binary values in step 402, converting the series of binary values to a series of integers in step 403, calculating a normalization factor for the series of integers in step 404, dividing each of the series of integers by the normalizing factor to produce an array of floating point numbers 405, storing the resulting floating point arrays in a design audio file 406, multiplying the design string with the normalizing factor and comparing the resulting arrays with the original array of integers, the difference between two arrays results in the error string 407, storing the error string and the normalizing factor in a text file 408.

Figure 5A:
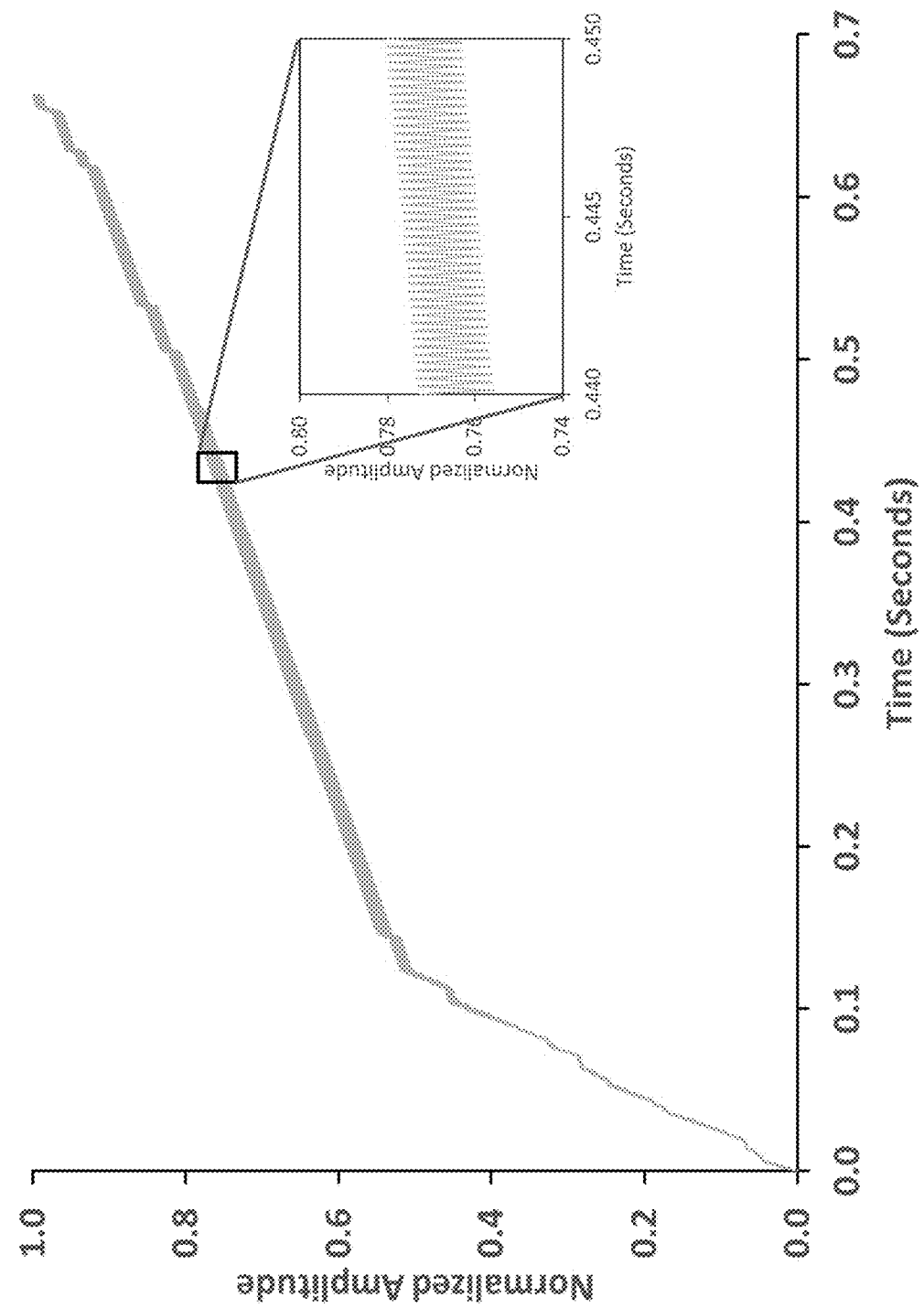
FIG. 5A is an exemplary audio file of the present invention.
Figure 5B:
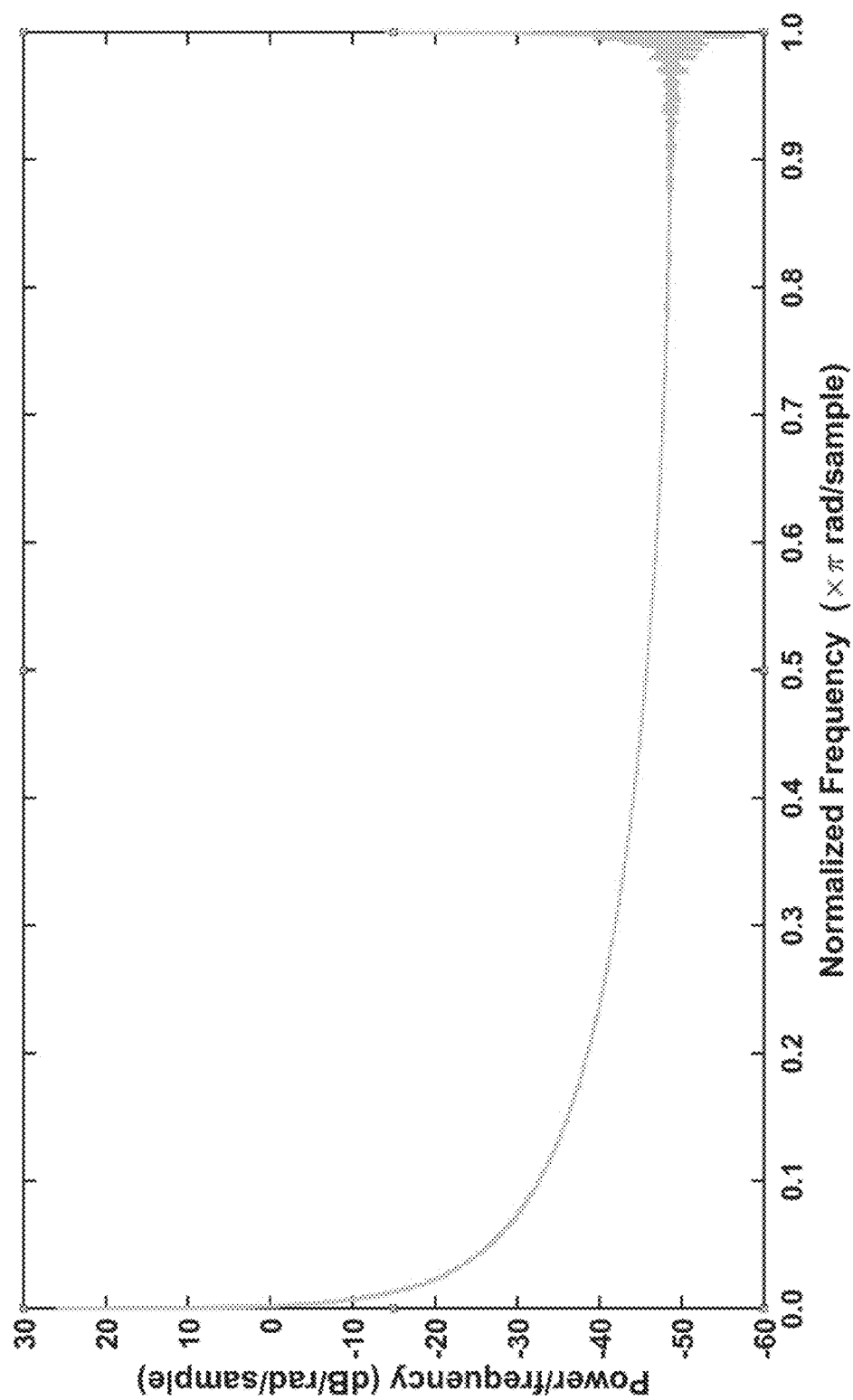
FIG. 5B is an exemplary power spectral diagram of the present invention.

Referring now to FIG. 5A, an exemplary normalized time domain audio file produced from a CAD solid model file according to a method of the present invention is shown, with detail provided in the inset. Referring now to FIG. 5B, an exemplary power spectral diagram of a normalized audio file produced from a CAD solid model file according to a method of the present invention is shown.

Experimental Examples

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out the exemplary embodiments of the present invention, and are not to be construed as limiting in any way the remainder of the disclosure.

Various CAD solid model files were created, then encoded into sound files according to methods of the present invention. The sound files were then decoded and reconstituted back into the original CAD solid model files. When various dimensions were checked against the original CAD solid model file, the input and output CAD files were found to be identical.

The first CAD solid model file is shown in FIG. 6A. Original CAD solid model file 601 is a hollow cube, shown in sectional view in order to show the internal geometry. The normalized time-domain audio file for the design string produced by a method of the present invention is shown in 602. The time domain audio file was reconstituted back into CAD solid model file 603, which is identical in dimensions to CAD solid model file 601.

The second CAD solid model file is shown in FIG. 6B. Original CAD solid model file 611 is a hollow cylinder, shown in sectional view in order to show the internal geometry. The normalized time-domain audio file produced by a method of the present invention is shown in 612. The time domain audio file was reconstituted back into CAD solid model file 613, which is identical in dimensions to CAD solid model file 611.

The third CAD solid model file is shown in FIG. 6C. Original CAD solid model file 621 is an exemplary airplane part. The normalized time-domain audio file produced by a method of the present invention is shown in 622. The time domain audio file was reconstituted back into CAD solid model file 623, which is identical in dimensions to CAD solid model file 621.

The methods of the present invention were shown to successfully create audio files from a variety of CAD solid model files, which could then be decoded back into the original CAD solid model file with identical characteristics and without any loss.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A system for producing an audio file, comprising a non-transitory computer-readable medium with instructions stored thereon, that when executed by a processor perform the steps of:
    converting an additive manufacturing design file to a text-based file;
    converting the entire text-based file to a series of binary values;

converting the entire series of binary values to a series of integers;

calculating a normalization factor for the series of integers;

dividing each of the series of integers by the normalizing factor to produce an array of floating-point numbers;

multiplying the array of floating point numbers by the normalizing factor and subtracting the series of integers to produce an error string;

converting the array of floating point numbers to a design audio file;

and storing the normalizing factor and error string as a text file;

wherein the system further verifies the authenticity of an additive manufacturing design file, and wherein the instructions further perform the steps of:

comparing the design audio file to a second output audio file generated from a second additive manufacturing design file;

and indicating via an output means that the first additive manufacturing design file is authentic if the design audio file matches the second output audio file.

2. The system of claim 1, wherein the instructions further comprise the step of converting the design audio file to a frequency domain using a Discrete Fourier Transform.

3. The system of claim 1, wherein the instructions further comprise the step of producing a stereo output audio file wherein the design audio file is one channel of the output audio file and the other channel comprises music.

4. The system of claim 1, wherein the instructions further comprise the step of applying an audio compression algorithm to the output audio file.

5. The system of claim 4, wherein the audio compression algorithm is a lossless audio compression algorithm.

6. The system of claim 1, wherein the instructions further comprise the step of reversing each of the binary values in the series.

7. The system of claim 1, wherein the instructions further comprise the step of adding a demarcating value between each of the binary values in the series, wherein the demarcating value is −1.

8. The system of claim 1, wherein the instructions further comprise the step of generating a random position number I and inserting an additional binary value in the Ith position in the series of binary values.

9. The system of claim 1, wherein the instructions further comprise the steps of:

generating a first audio fingerprint from the first output audio file;

comparing the first audio fingerprint to a second audio fingerprint generated from the second output audio file;

and determining that the first output audio file matches the second output audio file if the first audio fingerprint matches the second audio fingerprint.

10. The system of claim 1, wherein the instructions further comprise the step of applying an audio compression algorithm to the first audio file.

11. The system of claim 1, wherein the instructions further comprise the step of converting the output audio file to a frequency domain using a Discrete Fourier Transform.

12. The system of claim 1, wherein the system further identifies an additive-manufacturing design file, and wherein the instructions further perform the steps of generating a first audio fingerprint from the design audio file;

comparing the first audio fingerprint to a library of audio fingerprints stored in a database, each audio fingerprint in the library of audio fingerprints being associated with an additive manufacturing design file from which the audio fingerprint was generated; and indicating via an output means an identifying parameter of the additive manufacturing design file if the first audio fingerprint matches an audio fingerprint from the library of audio fingerprints.

13. The system of claim 12, wherein the instructions further comprise the step of applying an audio compression algorithm to the first audio file.

14. The system of claim 12, wherein the instructions further comprise the step of converting the output audio file to a frequency domain using a Discrete Fourier Transform.

15. The system of claim 1, wherein the system further compresses the additive-manufacturing design file, and wherein the instructions further perform the step of compressing the output audio file using an audio compression algorithm-, wherein the audio compression algorithm is a lossless compression algorithm or Free Lossless Audio Codec (FLAC).

16. The system of claim 1, further comprising a decoding process comprising the steps of:

retrieving the normalizing factor and error string as a text file;

retrieving the design audio file;

converting the design audio file to a decoded array of floating point numbers;

multiplying the decoded array of floating point numbers by the normalizing factor to produce a denormalized series of integers;

adding the error string to the denormalized series of integers to produce a decoded series of integers;

converting the decoded series of integers to a decoded series of binary values;

converting the decoded series of binary values to a decoded text-based file; and converting the decoded text-based file to a decoded additive manufacturing design file.

17. A system for producing an audio file, comprising a non-transitory computer-readable medium with instructions stored thereon, that when executed by a processor perform the steps of:

converting a Computer-Aided Design (CAD) file to a text-based file;

converting the entire text-based file to a series of binary values;

reversing each binary value for added security;

adding "−1" for demarking space between different binary values to produce a resulting array;

converting the entire resulting array to individual bits;

and generating an output audio file from the individual bits;

wherein the system further verifies the authenticity of an additive manufacturing design file, and wherein the instructions further perform the steps of:

comparing the design audio file to a second output audio file generated from a second additive manufacturing design file;

and indicating via an output means that the first additive manufacturing design file is authentic if the design audio file matches the second output audio file.

18. The system of claim 17, further comprising:

generating a random number and adding "0" to the binary values after each random number positions in the binary data to improve security; and reversing each of the binary values in the series with the random number for added security.

\* \* \* \* \*